April 30, 1957 J. B. DYER 2,790,333
WINDSHIELD WIPER ACTUATING MECHANISM
Filed June 13, 1952
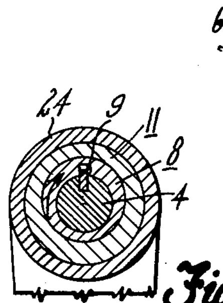
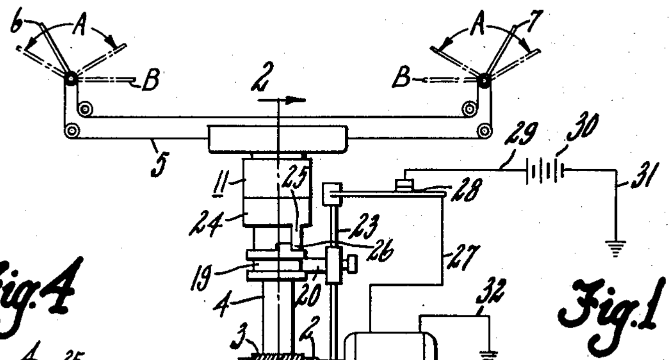
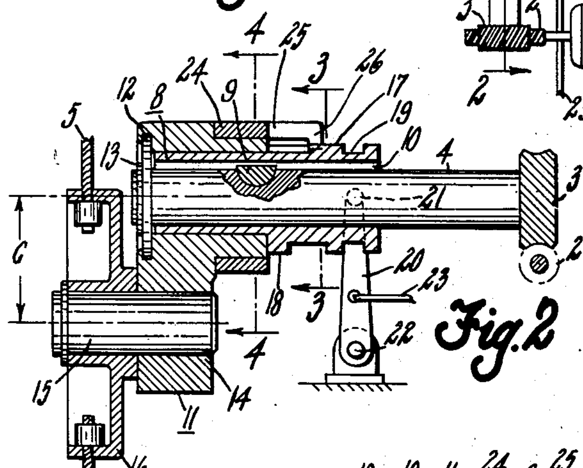
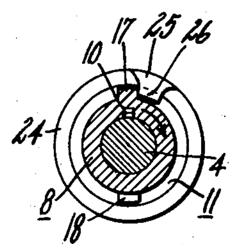
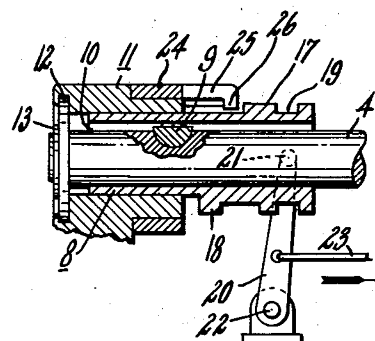
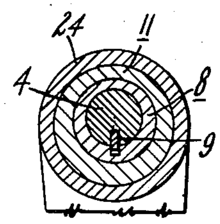
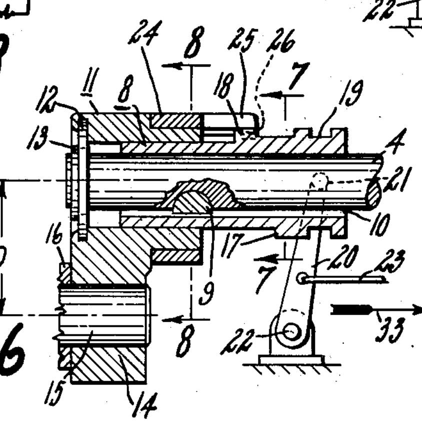
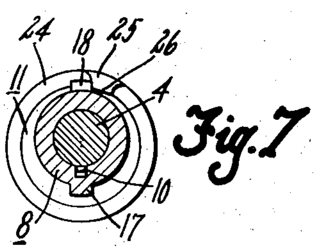
INVENTOR.
JOHN B. DYER
BY
Willits, Hardman and Fehr
HIS ATTORNEYS

UNITED STATES PATENT OFFICE 2,790,333

Patented Apr. 30, 1957

2,790,333

WINDSHIELD WIPER ACTUATING MECHANISM

John B. Dyer, Syracuse, N. Y., assignor to General Motors Corporation, Detroit, Mich., a corporation of Delaware Application June 13, 1952, Serial No. 293,356

10 Claims. (Cl. 74—600)

The present invention relates to windshield wipers and more particularly to actuating mechanisms for electric motor driven windshield wipers.

Electric windshield wiper assemblies are rather expensive as compared to suction operated devices. The added expense is primarily attributable to the use of reversible electric motors, which are utilized as an expedient to provide wiper element parking out of the normal range of vision. Accordingly, one of my objects is to provide a windshield wiper actuating mechanism having provisions for parking and driven by a unidirectional electric motor.

The aforementoned and other objects are accomplished in the present invention by employing a crank arm of variable length between a wiper actuating driven member and a driving member. Specifically, the effective length of the crank arm is determined by the position of a slidable eccentric, the position of which is manually controlled. In accordance with this principle, the unidirectional electric motor is coupled through suitable gearing with a shaft. An eccentric sleeve is keyed to the shaft in such a manner that it is adapted for axial movement relative thereto. The eccentric sleeve is provided with a pair of axially spaced, diametrically opposed radially outward extending teeth or lugs. The crank arm is rotatably journalled on the eccentric sleeve but is restrained from movement axially of the shaft. The crank arm is provided with means having a radially inward projecting tooth or lug, which is selectively engageable with either of the teeth or lugs on the eccentric sleeve, depending upon the position thereof. The crank arm is suitably connected to the wiper actuating driven member. The motor is controlled by a manually actuated switch and the actuating mechanism therefor is interconnected with the actuating mechanism for moving the slidable eccentric sleeve.

When the manual control mechanism is actuated to energize the electric motor, the several elements are so positioned that the effective length of the crank arm is at a minimum. In this instance the wiper blades will be oscillated throughout their normal range of movement. When the manual control mechanism is actuated to deenergize the motor, the ecentric sleeve is moved so that the effective length of the crank arm is at its maximum. The motor has sufficient inertia to extend the crank arm to its maximum length after deenergization thereof, and the coasting motor will be stalled when the wiper elements reach the parked position. As is customary in present day vehicles, the wiper blades will assume a position in contiguous relation to the cowl structure of the motor vehicle when they are parked, and when the blades reach this position, the motor will be stalled. Further means are provided to afford manual movement of the wiper blades independent of the motor driven shaft.

Further objects and advantages of the present invention will be apparent from the following description, reference being had to the accompanying drawing wherein a preferred embodiment of the present invention is clearly shown.

In the drawing:

Fig. 1 is a partially diagrammatic view illustrating a typical arrangement of the present invention.

Fig. 2 is a sectional view taken along line 2—2 of Fig. 1.

Figs. 3 and 4 are sectional views taken, respectively, on lines 3—3 and 4—4 of Fig. 2.

Fig. 5 is a fragmentary sectional view showing the position of the mechanism wherein the wiper elements may be manually moved independent of the driving shaft.

Fig. 6 is a fragmentary sectional view illustrating the position of the eccentric sleeve determining the maximum crank arm length.

Figs. 7 and 8 are sectional views taken, respectively, on lines 7—7 and 8—8 of Fig. 6.

Referring more particularly to Fig. 1 a wind-shield wiper mechanism is shown including a unidirectionl electric motor 1, which drives a worm 2. The worm 2 drivingly engages a worm gear 3 which is anchored to drive shaft 4. The drive shaft 4 is operatively connected through an actuating mechanism, to be described, to a flexible cable 5, which transmits oscillatory, or back and forth movement to a pair of wiper elements 6 and 7 through the medium of a plurality of pulleys.

Referring more particularly to Figs. 2 to 4, the drive shaft 4 is encompassed by an eccentric sleeve 8. The eccentric sleeve 8 is rotatably connected to the shaft 4 by means of a key 9, which engages a longitudinally extending keyway 10 in the sleeve 8 so as to permit axial movement of the sleeve 8 relative to the shaft 4. A bored crank arm 11 is rotatably journalled on the eccentric sleeve 8, but is restrained from axial movement relative to the shaft 4 by means of a disc 12. The disc 12 is held in position on the shaft bore by means of a snap ring 13. The crank arm 11 also provides a journal 14 for a crank pin 15, which carries a link 16 to which the ends of the flexible cable 5 are secured.

The eccentric sleeve 8 is provided with a pair of axially spaced, diametrically opposed teeth or lugs 17 and 18. In addition, the sleeve 8 is provided with an annular groove 19 which, in effect, forms a yoke by which movements of a pivoted lever 20 may effect axial movement of the sleeve 8. One end 21 of the lever 20 rides in the groove 19, while the other end thereof is pivoted at 22 to a fixed support. The intermediate portion of the lever 20 is connected by a Bowden cable 23 to a manually actuatable knob within the vehicle.

The crank arm 11 is provided with a sleeve 24 having an axial extension 25, which terminates in a radially inward projecting tooth or slug 26. The sleeve 24 is suitably pressed on the crank arm 11 so as to transmit movement from the eccentric sleeve 8 to the crank arm 11.

Referring again to Fig. 1, the wiper elements 6 and 7 have a normal range of movement, designated by the arcuate distance A. However, when the motor is deenergized, the wiper elements are moved to the position B, which is substantially out of a normal range of movement A. The motor 1 is diagrammatically shown as connected by conductive lead 27, switch 28, and conductive lead 29 to one terminal of a battery 30. The other terminal of the battery 30 is grounded by conductive lead 31, as is the other conductive lead 32 of the motor 1. The switch 28 is manually actuated through movements of the Bowden cable 23. If desired, a plurality of different operating speeds for the motor may be provided in a known manner. With the several parts in the position they are shown in Figs. 1 to 4, the wiper elements 6 and 7 will be moved throughout the arcuate distance A in the following manner: rotation of the motor driven worm 2 will effect rotation of the drive shaft 4 through the worm gear 3. The shaft 4 will, in turn, drive the eccentric sleeve 8 in the direction of the arrows in Figs. 3 and 4. In this instance, the tooth or lug 17 provided on the sleeve, will engage the tooth 26 and impart a rotary movement to the crank arm 11. The crank arm 11 will impart a translatory motion to the link 16 through the crank pin 15, which will oscillate the cable 5 to impart a back and forth movement to the wiper elements 6 and 7 throughout the arcuate distance A. In this instance, the effective length of the crank arm 11 is the distance C between the axis of the shaft and the axis of the crank pin 15.

Referring to Fig. 5, the eccentric sleeve 8 is shown in an intermediate position wherein neither of the teeth 17 or 18 will engage the tooth 26 of the crank arm 11 during relative rotation between the crank arm 11 and the shaft 4. With the eccentric sleeve 8 and cable 23 in this position, the motor 1 is deenergized by reason of the switch 28 being open. With the eccentric sleeve 8 in this position, the wiper elements 6 and 7 may be manually moved independent of movement of the shaft 4. This feature is provided to permit haphazard manual movement of the windshield wiper elements 6 and 7 without damaging the drive mechanism.

Referring to Figs. 6 to 8, the slidable eccentric sleeve 8 is moved by the lever 20 and the cable 23 to a position where the driving connection between the shaft 4 and the crank arm 11 is afforded by the engagement between tooth 26 and tooth 18. To effect this driving connection, the sleeve 8 must be moved throughout 180° relative to the crank arm 11 from the position it is shown in Fig. 4 to the position it is shown in Fig. 8. In this instance, the effective length of the crank arm 11, determined by the distance D between the axis of the shaft 4 and the axis of the crank pin 15, is greater than the distance C, designated in Fig. 2. The greater effective length of the crank arm 11, resulting in a greater throw of the crank pin 15, is utilized to move the wiper elements 6 and 7 to the position B in Fig. 1. As the switch 28 is opened by movement of the Bowden cable 23 in the direction indicated by the arrow 33 in Fig. 6, the armature of the motor must have sufficient inertia to continue the rotation of the shaft 4 and the eccentric 8 throughout 180° until the tooth 18 engages the tooth 26 and the crank arm 11 is extended, to drive the wiper elements 6 and 7 to the parked position B, which will stall the coasting motor speed. As less than one revolution of the shaft 4 is required to drive the wiper elements 6 and 7 to the parked position B, no difficulty will be encountered in providing an electric motor having an armature with sufficient inertia to effect this operation.

The operation of the windshield wiping actuating mechanism is as follows: With the motor energized and the eccentric sleeve 8 in the position shown in Fig. 2, movement will be transmitted from the shaft 4 through sleeve tooth 17, crank arm tooth 26, the crank arm 11, the crank pin 15, and the lever 16 to the cable 5. In this instance, the effective length of the crank arm is the distance C, which oscillates the wiper elements 6 and 7 throughout the range A, as indicated in Fig. 1. When it is desired to park the wiper elements 6 and 7 outside of their normal range at position B, the cable 23 is moved in the direction of arrow 33, thereby effecting movement of the eccentric sleeve 8 in the position it is shown in Fig. 2 to the position it is shown in Fig. 6. During movement of the cable 23 to effect this movement of the sleeve 8, the motor switch 28 is opened, thereby deenergizing the motor 1. As soon as tooth 17 is moved out of engagement with tooth 26, lost motion occurs between shaft 4 and the crank arm 11.

This relative movement is desirable since the shaft 4 is driven, after opening of switch 28, by the inertia of the motor armature. The shaft 4 rotates at a speed of approximately 70 R. P. M. and ordinarily the relative movement between the shaft 4 and eccentric 8 and the crank arm 11 will be at most a few revolutions. When the sleeve 8 has been moved to a position where sleeve tooth 18 is in axial alignment with the crank tooth 26, continued rotation of the shaft and sleeve will effect driving engagement between these teeth and cause movement of the crank arm, which now has an effective length D that is greater than the effective length C. The wiper elements 6 and 7 will then be driven into the parked position B due to the greater length of the crank arm 11, which will instantaneously stall the coasting shaft 4.

Should it be necessary to manually move the wiper elements 6 and 7 after they have been parked at the position B, it is only necessary to manipulate the Bowden cable to move the sleeve 8 to an intermediate position where neither tooth 17 nor tooth 18 of the sleeve 8 are in alignment with the tooth 26 of the crank arm 11. In this instance the wiper elements 6 and 7 may be manually moved to permit cleaning of the windshield without imposing undue strain on the drive mechanism including shaft 4 and the motor 1. To cause operation of the wiping elements 6 and 7 from the parked position B, it is only necessary to move the sleeve 8 by means of the cable 23 from the position it is shown in Fig. 6 to the position it is shown in Fig. 2, which simultaneously effects energization of the motor 1 through closing of the switch 28.

From the aforegoing description it is apparent that the present invention provides an electric motor driven windshield wiper of simple construction and embodying a relatively small number of parts. Moreover, as the mechanism is designed to be actuated by a unidirectional motor, the mechanism may be economically manufactured.

While the embodiment of the present invention as herein disclosed, constitutes a preferred form, it is to be understood that other forms might be adopted.

What is claimed is as follows:

1. Windshield wiper actuating mechanism including, a rotatable driving member, a driven member, a crank arm of variable length interconnecting the driving and driven members, a driven eccentric element rotatably connected to said driving member but adapted for axial movement relative thereto, and means whereby effecting relative axial movement between said driving member and driven eccentric element simultaneously with rotation of the driving member varies the length of said crank arm.

2. Windshield wiper actuating mechanism including, a unidirectional rotatable driving member, a driven member having a translatory motion, a crank arm of variable length interconnecting the driving and driven members, a driven eccentric element rotatably connected to said driving member but adapted for axial movement relative thereto, and means whereby effecting relative axial movement between said driving member and driven eccentric element simultaneously with rotation of the driving member varies the length of said crank arm.

3. Windshield wiper actuating mechanism including, a rotatable driving member, a driven member, a crank arm of variable length interconnecting the driving and driven members, an eccentric sleeve rotatably connected to said driving member and selectively connectible with said crank arm, said eccentric sleeve being adapted for axial movement relative to said driving member, and means whereby effecting relative axial movement between said driving member and eccentric sleeve simultaneously with rotation of the driving member varies the length of said crank arm.

4. Windshield wiper actuating mechanism including, a rotatable driving member, a driven member, a crank arm of variable length interconnecting the driving and driven members, an eccentric sleeve rotatably connected to said driving member and selectively connectible with said crank arm, said eccentric sleeve being adapted for lineal movement relative to said driving member, and means including cooperable lugs on said crank arm and eccentric sleeve whereby effecting relative movement reciprocable between said driving member and eccentric sleeve simultaneously with rotation of the driving member varies the length of said crank arm.

5. Windshield wiper actuating mechanism including, a rotatable driving member, a driven member, a crank arm of variable length interconnecting the driving and driven members, an eccentric sleeve rotatably connected to said driving member and selectively connectible with said crank arm, said eccentric sleeve being adapted for lineal movement relative to said driving member, and means including a pair of axially spaced, diametrically opposed teeth on said eccentric sleeve and a cooperable tooth on said crank arm whereby effecting relative reciprocable movement between said driving member and eccentric sleeve simultaneously with rotation of the driving member varies the length of said crank arm.

6. Windshield wiper actuating mechanism including, a rotatable driving member, a driven member, a crank arm of variable length interconnecting said driving and driven members, a driven eccentric element rotatably connected to said driving member and interposed between said driving member and crank arm, and means including a lost motion connection between said driven eccentric element and said crank arm whereby relative reciprocable movement between said driven eccentric element and crank arm simultaneously with rotation of the driving member varies the effective length of said crank arm.

7. Windshield wiper actuating and control mechanism including, in combination, means including a unidirectional electric motor, a slidable eccentric and a variable length crank arm for actuating and controlling a wiper element, said crank arm having a shorter effective length when said eccentric is in one position than it does when the eccentric is in another position, and means simultaneously operable to control the energization of said motor and the position of said eccentric.

8. Windshield wiper actuator and control mechanism including, in combination, means including a unidirectional electric motor, a slidable eccentric sleeve and a variable length crank arm for actuating and controlling a wiper element, said crank arm having a shorter effective length when said sleeve is in one position than it does when the sleeve is in another position and means coincidentally operable to deenergize said motor and move said sleeve to a position where the crank arm is extended, said motor having sufficient inertia to extend said crank arm after deenergization.

9. Windshield wiper actuator and control mechanism including, in combination, means including a unidirectional electric motor, a slidable eccentric sleeve and a variable length crank arm for actuating and controlling a wiper element, said crank arm having a shorter effective length when said sleeve is in one position than it does when the sleeve is in another position and means including a lever operatively connected with said sleeve, a control switch and a manually operable linkage interconnecting said switch and lever coincidentally operable to deenergize said motor and move said sleeve to a position where the crank arm is extended, said motor having sufficient inertia to extend said crank arm after deenergization.

10. Windshield wiper mechanism including, a unidirectional driving member, a slidable eccentric sleeve, a variable length crank arm for actuating a wiper element, said slidable eccentric sleeve having three operative positions, including a first position where the effective length of said crank arm is at a minimum, a second position where the driving connection between said driving member and said crank arm is interrupted, and a third position wherein the crank arm has a maximum effective length, and means associated with said sleeve for effecting movement thereof.

References Cited in the file of this patent

UNITED STATES PATENTS

| | | |
|---|---|---|
| 543,667 | Baker | July 30, 1895 |
| 2,173,447 | Horton | Sept. 19, 1939 |
| 2,241,378 | Evans | May 13, 1941 |

FOREIGN PATENTS

| | | |
|---|---|---|
| 461,255 | Great Britain | Feb. 15, 1937 |
| 850,999 | Germany | Sept. 29, 1952 |
| 874,715 | Germany | Apr. 27, 1953 |